S. J. STAPLES.
LINK CONNECTOR.
APPLICATION FILED MAY 4, 1912.

1,144,440.

Patented June 29, 1915.

Witnesses:

Inventor:
Sidney J. Staples
by attorneys
Luthgate & Luthgate

UNITED STATES PATENT OFFICE.

SIDNEY J. STAPLES, OF WEST NEW YORK, NEW JERSEY, ASSIGNOR TO THE AUTO PNEUMATIC ACTION COMPANY, A CORPORATION OF NEW YORK.

LINK-CONNECTOR.

1,144,440. Specification of Letters Patent. Patented June 29, 1915.

Application filed May 4, 1912. Serial No. 695,168.

*To all whom it may concern:*

Be it known that I, SIDNEY J. STAPLES, a citizen of the United States, residing at West New York, in the county of Hudson and State of New Jersey, have invented a new and useful Link-Connector, of which the following is a specification.

In various mechanisms, particularly automatic musical instruments, a considerable number of levers and links are employed so that operating handles can be arranged at a convenient position and can be connected to the various controlling elements of the apparatus. It is usual in such construction to form a hole in the end of the lever and to bend the end of the link and to cut a thread thereon. The parts are connected by slipping this bent end of the link through the hole in the lever and securing the parts together by a nut threaded on the bent end of the link. A felt washer is usually arranged under the nut to prevent the parts from rattling. This construction is expensive, takes time to apply, is apt to rattle loose and to become noisy if the nut unscrews.

The object of this invention is to provide a suitable article or attachment to take the place of this arrangement which shall be very easy of application, cheap to manufacture and which will permanently connect the parts together so that noisy, loose connections will be practically eliminated. To this end, instead of using the screw-thread and nut, I employ a connector pressed out of sheet metal which is arranged with a spring arm to fit on the bent end of the link and with engaging means to fit around the body portion of the link. This connector can be very quickly snapped in place and the parts will be permanently held together and so joined that they will not rattle.

Figure 1:
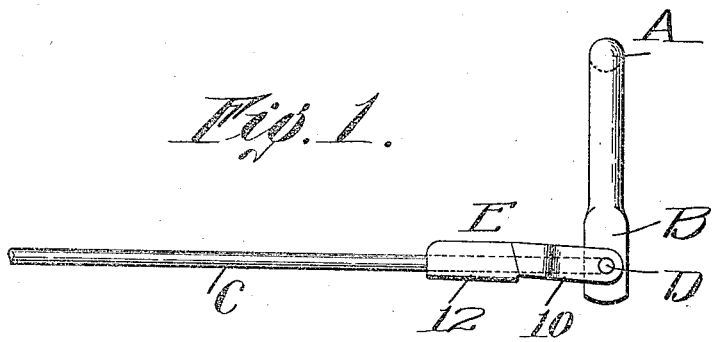
Figure 2:
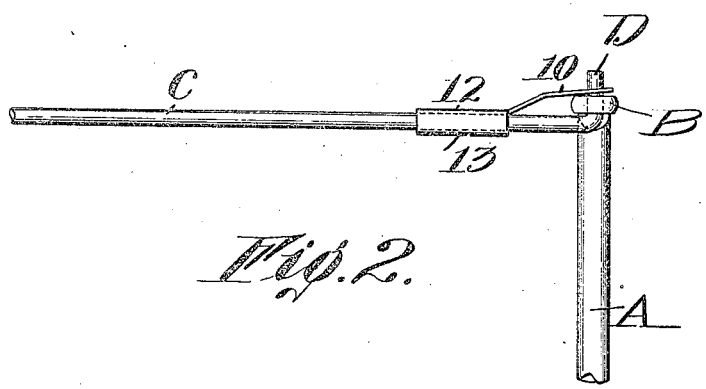
Figure 3:
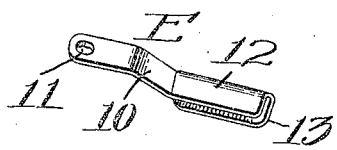

One application of the invention is shown in the accompanying drawing in which,

Figure 1 is a plan view of a lever and link having the attachment applied thereto; Fig. 2 is a front elevation, and Fig. 3 is a detailed perspective view of the attachment or connector.

Referring to the drawing and in detail A designates an operating shaft which has a lever or operating arm B bent therefrom, which is usually flattened and which has a hole punched therethrough. C designates the link, the end of which is bent at right angles as at D. These parts are of the usual construction except that the bent end D is not threaded.

E designates the connector. The same is preferably made out of sheet metal and stamped and bent so as to have an inclined spring arm 10 with a hole 11, a body section 12, and a section 13 bent around parallel with the body section 12. When it is desired to use the connector, the upturned end D of the link is pushed up through the hole in the lever B and the spring arm 10 on the connector E is placed in position by engaging the hole 11 thereof with the end D and by snapping the sections 12 and 13 on to the body portion of the link C. The sections 12 and 13 are shaped so that when engaged with the body portion of the link C, they will securely and firmly embrace and pinch on the same.

By this arrangement, the lever and link can be almost instantly secured together by the connector and when the connector is placed in position, the lever and link are permanently secured together in such manner that they will not rattle, the spring arm 10 being so formed that when the sections 12 and 13 are engaged with the body portion of the link C, the spring arm will be put under a slight tension.

The invention is capable of application for uniting any two members, one of which has a laterally extending part engaging into and projecting beyond a hole in the other member.

The arrangement and shape of the connector can be greatly varied without departing from the scope of my invention as expressed in the claims.

Having thus fully described my invention, what I claim and desire to secure by Letters-Patent is:—

1. The combination of a lever having a hole therethrough, a link having a bent end adapted to enter said hole, and a connector having a spring arm provided with a hole fitted on the bent end of the link and with a body section engaging the body of the link to hold the connector in position thereon.

2. The combination of a member having a hole in its end, a second member having a laterally extending part engaging into and projecting beyond the hole in the first member, and a sheet metal connector having a spring arm provided with a hole fitted on the projecting portion of said part and provided with sections for engaging on opposite sides of the second member.

3. The combination of a lever having a hole in its end, a link having a bent end fitting in said hole, and a sheet metal connector having a spring arm provided with a hole fitted on the bent end of the link and with a body section, and a section bent parallel thereto, said sections engaging the body of the link.

In testimony whereof I have hereunto set my hand, in the presence of two subscribing witnesses.

SIDNEY J. STAPLES.

Witnesses:
WILLIAM J. BARTON,
WILLIAM J. KELLEY.